United States Patent
Park

(10) Patent No.: US 6,408,007 B1
(45) Date of Patent: Jun. 18, 2002

(54) QUEUE ALLOCATION CONTROL METHOD FOR REAL TIME DATA TRANSMISSION DELAY COMPENSATION OF MOBILE COMMUNICATION SYSTEM

(75) Inventor: Jae-Hong Park, Seoul (KR)

(73) Assignee: Hyundai Electronics Inds., Co. Ltd., Ichon-shi (KR)

( * ) Notice: Subject to any disclaimer, the term of this patent is extended or adjusted under 35 U.S.C. 154(b) by 0 days.

(21) Appl. No.: 09/433,031

(22) Filed: Nov. 3, 1999

(30) Foreign Application Priority Data

Nov. 18, 1998 (KR) .............................. 98-49577

(51) Int. Cl.⁷ ............................................. H04L 12/28
(52) U.S. Cl. ..................... 370/412; 370/230; 370/429; 370/468
(58) Field of Search .................... 370/235, 252, 370/412, 428, 429, 328, 329, 229, 230, 310, 338, 465, 468

(56) References Cited

U.S. PATENT DOCUMENTS

| | | |
|---|---|---|
| 5,278,828 A | 1/1994 | Chao .......................... 370/395 |
| 5,729,540 A * | 3/1998 | Wegrzyn .................... 370/336 |
| 5,926,458 A * | 7/1999 | Yin ............................ 370/230 |
| 5,946,602 A * | 8/1999 | Sayegh ...................... 370/412 |

* cited by examiner

Primary Examiner—Ricky Ngo
(74) Attorney, Agent, or Firm—Lackenbach Siegel; J. Harold Nissen

(57) ABSTRACT

A queue allocation control method for a real time data transmission delay compensation of a communication system is disclosed. This method includes a step for checking whether a real time data is generated when a data packet transmitted from a base station to a certain terminal k is generated, a step for storing the data packet into a queue k corresponding to the terminal k when the data packet is a non-real time data, a step for comparing the length of the queue k corresponding to the terminal k with a set critical value when the data packet transmitted corresponds to a real time data, a step for storing the data packet into the queue k when the length of the queue k is smaller than or equal to the set critical value, searching the shortest queue j among a plurality of queues when the length of the queue k is larger than the critical value, and storing the data packet into the queue j, a step for transmitting a slot ID(j) to the terminal k, and a step for informing the data packet transmission completion to the terminal k when the data packet stored in the queue j is transmitted to the terminal k, for thereby decreasing a real time data transmission delay by implementing a real time data transmission using a common channel from a base station to a terminal.

4 Claims, 2 Drawing Sheets

QUEUE ALLOCATION CONTROL METHOD FOR REAL TIME DATA TRANSMISSION DELAY COMPENSATION OF MOBILE COMMUNICATION SYSTEM

BACKGROUND OF THE INVENTION

1. Field of the Invention

The present invention relates to a queue allocation control method when transmitting a data between a base station and a mobile station for a communication system, and in particular to a queue allocation control method for a real time data transmission delay compensation of a mobile communication system which is capable of decreasing a transmission delay of a real time data by implementing a real time data transmission using a common channel from a base station to a terminal.

2. Description of the Background Art

Generally, a common channel is a channel which is co-used by a plurality of users. As this common channel, a paging channel, an access channel, etc. are known.

In a mobile communication system, a voice and word data service is implemented via a communication channel, and the remaining channels are used for transmitting a control signal or a management data.

In particular, the amount of the real time data such as a voice data is large, it is impossible to use a lot amount of the real time data using a common channel having a small bandwidth.

Here, the real time data represents a data which is transmitted within a certain time to a destination point. It is recognizes that the data transmitted beyond a certain time are lost. As the real time data, voice and video data are known. In the case of the voice data, if a data receiving time is not uniform during a communication between users, a desired communication is not implemented even when a small communication is performed.

The current technique which uses a common channel for a mobile communication system is mainly used for a signal operation. Various queue allocation techniques are known for minimizing a delay time and a terminal battery consumption. These techniques have the following disadvantages for a real time data transmission.

First, for a real time data transmission, a delay time problem is more important rather than the power consumption of the terminal, so that a selection reference of a proper queue management technique is different. In the conventional art, since a queue is allocated by a fixed queue allocation method irrespective of a real time data or a non-real time data, a certain delay occurs in the real time data, and a data may be lost.

Second, in the case of the signaling, since the delay time problem is not important, the queue allocation technique is relatively simple. However, in the case of the real time data, it is very sensitive to the delay time, it is impossible to implement a real time data transmission based on the conventional queue allocation method for a signaling transmission.

SUMMARY OF THE INVENTION

Accordingly, it is an object of the present invention to provided a queue allocation control method for a real time data transmission delay compensation of a communication system which is capable of decreasing a real time data transmission delay by implementing a real time data transmission using a common channel from a base station to a terminal.

To achieve the above object, there is provided a queue allocation control method for a real time data transmission delay compensation of a communication system, which includes the steps of a step for checking whether a real time data is generated when a data packet transmitted from a base station to a certain terminal k is generated, a step for storing the data packet into a queue k corresponding to the terminal k when the data packet is a non-real time data, a step for comparing the length of the queue k corresponding to the terminal k with a set critical value when the data packet transmitted corresponds to a real time data, a step for storing the data packet into the queue k when the length of the queue k is smaller than or equal to the set critical value, searching the shortest queue j among a plurality of queues when the length of the queue k is larger than the critical value, and storing the data packet into the queue j, a step for transmitting a slot ID(j) to the terminal k, and a step for informing the data packet transmission completion to the terminal k when the data packet stored in the queue j is transmitted to the terminal k.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
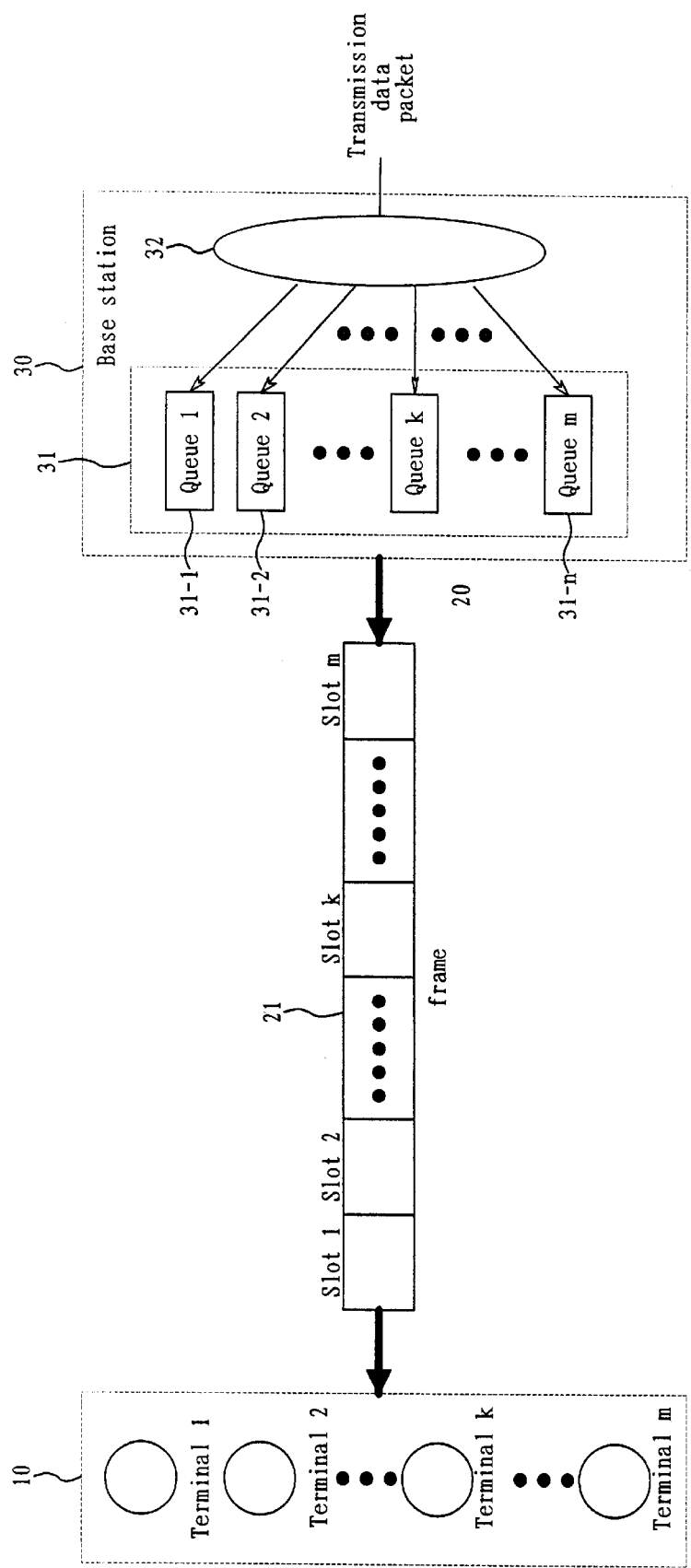
FIG. 1 is a view illustrating a data transmission method between a base station and a mobile station for a mobile communication system according to the present invention.

FIG. 1 is a view illustrating a data transmission method between a base station and a mobile station for a mobile communication system according to the present invention.

As shown therein, reference numerals 10 represents a terminal group formed of a plurality of terminals (terminal 1 through terminal m) for transmitting and receiving a data with a base station based on a wireless communication, 20 represents a common channel, 21 represents a frame for a real time data transmitted from a base station to a terminal via the common channel 20, and 30 represents a base station for mapping a real time data to the common channel and transmitting the data to a corresponding terminal of the terminal group 10.

The base station 30 includes a temporary storing unit 31 having a plurality of queues 31-1 through 31-n for temporarily storing a data transmitted to each terminal 10, and a queue allocation controller 32 for controlling a plurality of queues 31-1 through 31-m of the data temporary storing unit 31.

The queue allocation control method for a real time data transmission delay compensation according to the present invention will be explained with reference to a mobile communication system.

As shown in FIG. 1, the mobile communication system transmits a real time data via a slot mode in which a data is divided into a plurality of size slots in a non-continuous form, and the thusly divided data are transmitted. The transmission line occupying ratio is determined based on an ownership of the slot.

In order to transmit the real time data to the terminal group 10 via the common channel, the queue allocation controller 32 of the base station 30 checks a real time/non-real time of the data and the lengths of the queues 31-1 through 31m.

The temporary storing unit 31 temporarily stores the data corresponding to a corresponding queue in accordance with a result of the above-described check and transmits the temporarily stored data to the terminal group 10 by mapping the data to the common channel.

As described above, the queue allocation controller 32 separates whether the transmission data corresponds to a non-real time data, and the length of a corresponding queue is checked, and then the queue is allocated.

Figure 2:
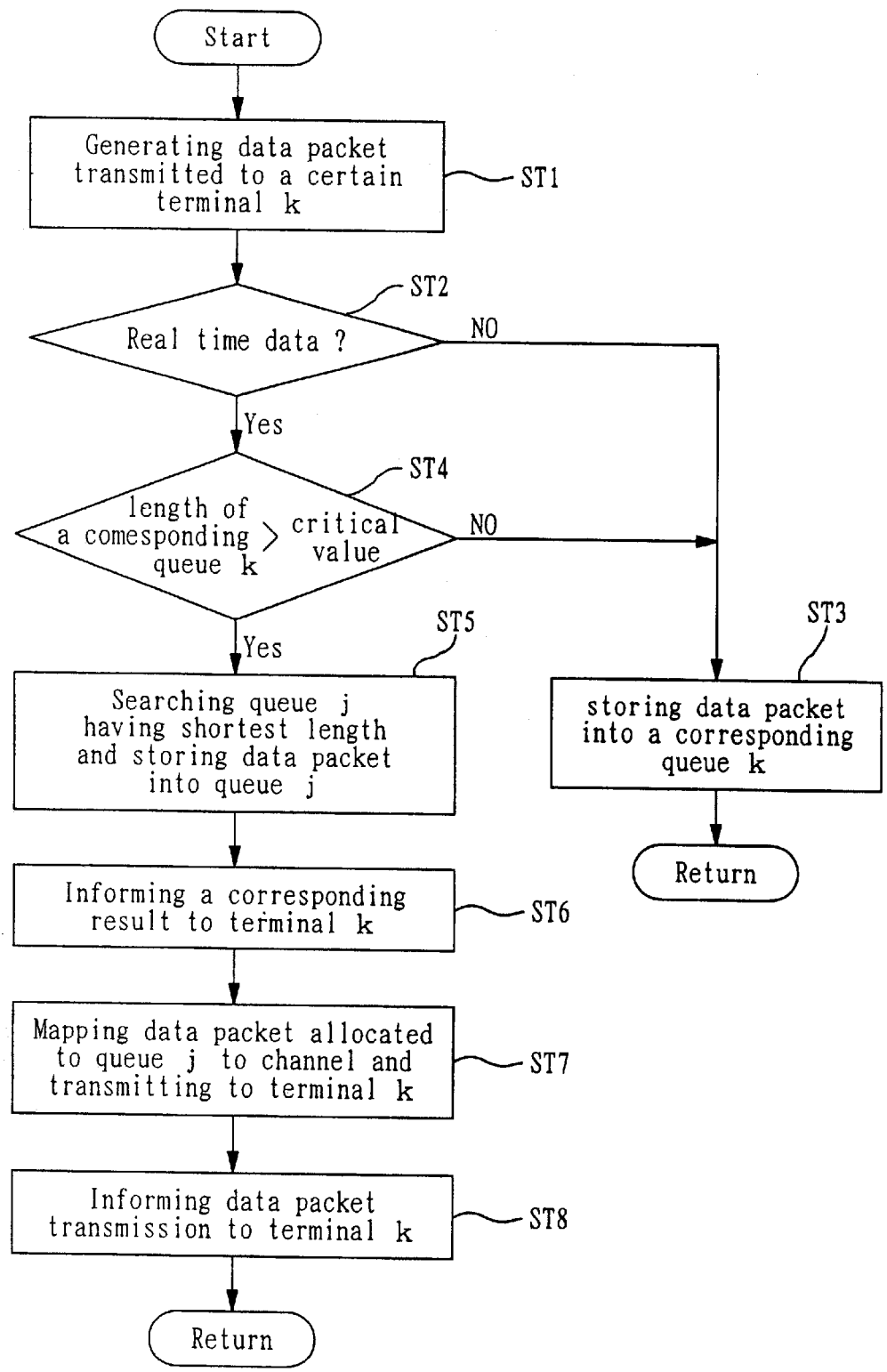
FIG. 2 is a view illustrating a queue allocation control method for a real time data transmission delay compensation of a communication system according to the present invention.

The queue allocation control method will be explained with reference to FIG. 2.

When a data packet which will be transmitted to a certain terminal k occurs in the base station 30, it is checked whether the data packet corresponds to a real time data in Steps ST1 and ST2. If the data packet corresponds to the non-real time data, the data packet is stored into the queue k(31-k) corresponding to the terminal k in Step ST3. If the data packet corresponds to the real time data, the lengths of the queue k(31-k) corresponding to the terminal k and a set critical value are compared in Step ST4. If the length of the queue k(31-k) is smaller than the set critical value, the data packet is stored into the queue k(31-k). If the length of the queue k(31-k) is larger than the critical value, the shortest queue among a plurality of queues is searched, and the data packet is stored into a corresponding queue j(31-j) in Step ST5. The slot ID(j) is transmitted to the terminal k in Step ST6. The data packet stored in the queue j(31-j) is transmitted to the terminal k. In Steps ST7 and ST8, the data packet transmission completion is informed to the terminal k.

The queue allocation method according to the present invention will be explained.

As shown in FIG. 1, the base station 30 includes a plurality of queues 31-1 through 31-n. One queue among the queues 31-1 through 31-n corresponds to one terminal based on an one-to-one method, and one queue corresponds to one slot in the frame carried on the common channel based on an one-to-one method. Namely, an i-th queue among a plurality of the queues is used as a temporary storing queue of the data transmitted to the i-th terminal, and the data stored in the i-th queue is carried on the i-th slot at each frame of the common channel and is transmitted to the i-th terminal.

Therefore, the i-th terminal does not continuously monitors the channel during the entire frame time. Namely, the i-th terminal monitors only the i-th slot for thereby receiving a data transmitted to itself, so that it is possible to decrease the power consumption.

If the data transmitted to the i-th terminal is a real time data, and the length of the i-th queue has a certain size, the data may not be stored into a corresponding queue.

Therefore, in the present, invention, the shortest queue is searched, and the data is stored into the i-th queue, and the ID of the shortest queue is informed to the i-th terminal. In the i-th terminal, the i-th slot and the slot corresponding to the ID is monitored, so that it is possible to decrease the delay time of the real time data.

The above-described operation will be explained in detail with reference to FIG. 2.

First, the queue allocation controller 32 of the base station 30 generates a data packet to be transmitted to a certain terminal(for example, k-th terminal) in Step ST1, it is checked whether the generated data corresponds to the real time data in Step ST2.

As a result of the check, if the generated data corresponds to the non-real time data, the data packet is stored into the queue k corresponding to the k-th terminal, and a corresponding data packet is transmitted to the terminal k in Step ST3.

Next, in the case that the data transmitted to the terminal k corresponds to a real time data, the queue allocation controller 32 compares the length of the queue k corresponding to the terminal k with a set critical value in Step ST4.

As a result of the comparison, in the case that the length of the queue k is smaller than the set critical value, since it means that a corresponding queue k is empty, the real time data packet is stored into the queue k, and the data is transmitted to a corresponding terminal k. In this case, the k-th terminal monitors the k slot based on the common channel and receives a data. The critical value is a value set for receiving into a corresponding terminal without a data packet delay. In other words, the critical value is a reference value for checking the data packet storing amount of the queue.

In the case that the length of the queue k is greater than the set critical value, it means that a lot amount of the data of the queue k is stored, a certain delay occurs when storing the real time data into a corresponding queue k, and the real time data may be lost.

Therefore, in this case, the data is not stored into a corresponding queue k, and the shortest queue (for example, the j-th queue) among a plurality of queues is searched in Step ST5, and the generated data packet is stored into the queue j. The slot ID corresponding to the queue j is informed to a corresponding terminal k via a broadcasting channel in Step ST6.

Since the terminal k monitors the k-th slot among the frames of the common channel, the data of the terminal k is carried on a certain slot j of the common channel, and the terminal k does not receive the data. Therefore, the operation that the data of the terminal k is carried on another queue j is informed to the terminal k.

The terminal k which receives the ID of the queue j monitors the j-th slot except for the k-th slot among the frames of the common channel, so that it is possible to receive all data without any delay.

When the data packet transmission is completed, the base station 30 informs the completion to the terminal k, so that a corresponding terminal k receives the data carried on the j-th slot, and the monitoring of the j-th slot is automatically released.

As described above, in the present invention, it is possible to transmit a real time data via a common channel without using a dedicated channel which is used for a conventional real time data transmission method.

In addition, in the present invention, since a real time data is transmitted via a common channel, it is possible to decrease the use of the dedicated channel, and a process for managing the dedicated channel is not used.

Since it is possible to implement a real time data transmission based on a dynamic queue allocation control method and a common channel, the transmission delay of the real time data is decreased.

In the present invention, since the real time data transmission is implemented using a common channel which is not used for a conventional real time data transmission, it is possible to effectively use the resource of the system based on a wireless communication.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a real time data transmission method for a communication system, a queue allocation control method for a real time data transmission delay compensation of a communication system, comprising the steps of:

a step for checking whether a real time data is generated when a data packet transmitted from a base station to a certain terminal k is generated;

a step for storing the data packet into a queue k corresponding to the terminal k when the data packet is a non-real time data;

a step for comparing the length of a queue k corresponding to the terminal k with a set critical value when the data packet transmitted corresponds to a real time data;

a step for storing the data packet into the queue k when the length of the queue k is smaller than or equal to the set critical value, searching shortest queue j among a plurality of queues when the length of the queue k is larger than the critical value and ID of the shortest queue j is informed, and storing the data packet into the shortest queue j;

a step for transmitting a slot ID corresponding to the queue j, hereinafter ID (j) to the terminal k after storing the corresponding queue j into the data packet; and a step for informing the data packet transmission completion to the terminal k when the data packet stored in the queue j is transmitted to the terminal k.

2. The method of claim 1, wherein said critical value is a previously set reference value for checking whether it is possible to store the data packet generated in the queue k.

3. The method of claim 1, wherein one queue among a plurality of the queues corresponds to one terminal.

4. The method of claim 1, wherein said terminal monitors a slot corresponding to the ID except for a previously set slot when a receiving data receives a slot ID of a frame, which carries the receiving data, from the base station for mapping the real time data.

* * * * *